United States Patent [19]
Scheithauer et al.

[11] Patent Number: 4,608,084
[45] Date of Patent: Aug. 26, 1986

[54] RECOVERY OF COBALT AND CHROMIUM

[75] Inventors: Richard A. Scheithauer; Michael J. Miller; Clarence D. Vanderpool; Martin B. MacInnis, all of Towanda, Pa.

[73] Assignee: GTE Products Corporation, Stamford, Conn.

[21] Appl. No.: 718,257

[22] Filed: Apr. 1, 1985

[51] Int. Cl.$^4$ .................. C22B 23/04; C22B 34/32
[52] U.S. Cl. .................. 75/101 R; 75/108; 75/114; 75/119; 75/121; 423/55; 423/140; 423/147; 423/150; 502/28
[58] Field of Search .......... 423/55, 54, 147, 150, 423/140; 75/101 R, 108, 114, 119, 121; 502/28

[56] References Cited

U.S. PATENT DOCUMENTS 3,544,309 12/1970 Fletcher et al. .................. 423/54
3,607,236 9/1971 Brooks et al. .................... 423/54
3,840,469 10/1974 Hobbs et al. ..................... 502/28
4,522,928 6/1985 McVicker et al. ................ 423/54

Primary Examiner—John Doll
Assistant Examiner—Robert L. Stoll
Attorney, Agent, or Firm—William H. McNeill

[57] ABSTRACT

A process is disclosed for recovering cobalt and chromium from a cobalt and chromium containing alloy. The process involves first digesting the alloy in concentrated hydrochloric acid at a sufficient temperature for a sufficient time to form a first solution containing the major portion of the cobalt, chromium, and any iron and nickel present in the alloy and a first solid and separating the first solution from the first solid. Oxalic acid is then added to the first solution in an amount sufficient to subsequently precipitate the major portion of the cobalt and any iron and nickel contained in the first solution followed by adjustment of the ph to from about 1 to about 2 with a base and maintaining the temperature below about 20° for a sufficient time to form a second solid containing the major portion of the cobalt and the major portion of any iron and nickel which is present in the first solution and a second solution containing the major portion of the chromium which is present in the first solution and separation of the second solid from the second solution. The second solid is then washed with sufficient water to remove any water soluble impurities and separated from the resulting wash water. The resulting washed second solid is then contacted with a calcium chloride solution of sufficient calcium chloride concentration, at a sufficient temperature, for a sufficient time to form a third solution containing the major portion of the cobalt which was present in the second solid, and a third solid. The third solution is then separated from the third solid.

6 Claims, No Drawings

RECOVERY OF COBALT AND CHROMIUM

FIELD OF THE INVENTION

This invention relates to a process for recovery of cobalt and chromium from a cobalt and chromium containing alloy. More particularly it relates to a process for recovering cobalt and chromium from a cobalt and chromium containing alloy by first forming a solution of the major portion of the cobalt and chromium in concentrated hydrochloric acid followed by precipitation of the major portion of the cobalt with oxalic acid.

BACKGROUND OF THE INVENTION

Stellites are oxidation resistant alloys of varying compositions of basically tungsten, cobalt, chromium, and nickel. Waste grindings produced as a result of various machining operations with stellite alloy material represent a sizable source for reclaiming metal values such as tungsten, cobalt, and chromium.

Recovery of cobalt from stellite grindings by existing techniques has resulted in poor yields due to the presence of large amounts of chromium. Presently chromium is removed from chloride solutions as the hydroxide by adjusting the solution ph to about 3.5 and filtering to remove the insoluble hydroxide. Although greater than about 95% of the chromium is precipitated, about 20% to about 40% of the cobalt is also contained in the solid. Iron also precipitates and reports with the chromium solids. Chromium is not recovered from his solid due to the large amounts of cobalt and iron still associated with it.

A method to separate chromium from cobalt and efficiently recover both metals from such material would be desirable.

SUMMARY OF THE INVENTION

In accordance with one aspect of this invention, there is provided a process for recovering cobalt and chromium from a cobalt and chromium containing alloy. The process involves first digesting the alloy in concentrated hydrochloric acid at a sufficient temperature for a sufficient time to form a first solution containing the major portion of the cobalt, chromium and any iron and nickel present in the alloy and a first solid and separating the first solution from the first solid. Oxalic acid is then added to the first solution in an amount sufficient to subsequently precipitate the major portion of the cobalt and any iron and nickel contained in the first solution followed by adjustment of the pH to from about 1 to about 2 with a base and maintaining the temperature below about 20° C. for a sufficient time to form a second solid containing the major portion of the cobalt and the major portion of any iron and nickel which is present in the first solution and a second solution containing the major portion of the chromium which is present in the first solution and separation of the second solid from the second solution. The second solid is then washed with sufficient water to remove any water soluble impurities and separated from the resulting wash water. The resulting washed second solid is then contacted with a calcium chloride solution of sufficient calcium chloride concentration at a sufficient temperature for a sufficient time to form a third solution containing the major portion of the cobalt which was present in the second solid, and a third solid. The third solution is then separated from the third solid.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention By the process of this invention, cobalt and chromium are recovered from a cobalt and chromium containing alloy by forming a solution of the major portion of the cobalt and chromium and thereafter precipitating the major portion of the cobalt with oxalic acid.

The cobalt and chromium containing starting alloy of this invention is typically a stellite type of material in the form of grindings from machining operations. The alloy contains varying amounts of cobalt, chromium, iron, nickel, and tungsten. A typical analysis of the starting alloy is as follows, by weight: from about 20% to about 30% cobalt, from about 20% to about 30% chromium, from about 10 to about 20% nickel, about 10% tungsten, and other constituents such as iron.

The alloy material is first digested in concentrated hydrochloric acid, preferably from about 6 molar to about 12 molar, usually under reflux, at a sufficient temperature and for a sufficient time to form a first solution containing the major portion of the cobalt and chromium. The major portion of any iron and nickel present is also solubilized. The resulting insolubles or first solid contains the major portion of any tungsten, silicon, and aluminum which are not acid soluble. Tungsten can be subsequently recovered from the first solid by known methods. In general, the weight ratio of the hydrochloric acid to the alloy is from about 4 to 1 to about 10 to 1. Generally the digestion temperature is from about 95° C. to about 105° C. Digestion times are from about 2 hours to about 10 hours, the length of time being dependent on the temperature and amount of starting alloy. The first solution is then separated from the first solid by any standard technique such as filtration. A typical analysis of the first solution is as follows: about 36 grams Co per liter, about 26 grams of Ni per liter, about 41 grams Fe per liter, and about 20 grams of Cr per liter. The first solution contains at least about 99% by weight of the cobalt and at least about 99% by weight of the chromium which is initially present in the alloy.

To the first solution is then added oxalic acid in an amount sufficient to subsequently precipitate, as the oxalates, the major portion of the cobalt and also the major portion of any iron and nickel which is present in the first solution. Generally from about 1.0 to about 2.0 moles, and preferably, from about 1.2 to about 1.5 moles of oxalic acid are added per mole of cobalt, iron, and nickel.

Following the addition of the oxalic acid, the pH of the resulting oxalic acid treated first solution is adjusted to from about 1.0 to about 2.0 with a base, preferably sodium hydroxide.

The resulting pH adjusted oxalic acid treated first solution is then maintained at a temperature below about 20° C., usually by water cooling. It is then agitated at this temperature for a sufficient time, preferably about 2 hours, to form a second solid containing the major portion of the cobalt and the major portion of any iron and nickel which is present in the first solution and a second solution containing the major portion of the chromium which is present in the first solution.

The cobalt and nickel precipitate nearly quantitatively in the second solid. The second solid contains at least about 95% by weight of the cobalt which is initially present in the alloy. The amount of iron which precipitates in the second solid is dependent on its oxidation state. Any iron not oxizided, that is, in the II state, precipitates. This amount is usually at least about 90% by weight of the iron which is initially present in the alloy. Any iron in the III oxidation state is in the second solution.

The second solid is then washed with sufficient water to remove any water soluble impurities. The resulting wash water is then separated from the resulting washed second solid by any standard technique such as filtration.

The washed second solid is then contacted with a calcium chloride solution having a sufficient calcium chloride concentration at a sufficient temperature, preferably at boiling at about 100° C., for a sufficient time, preferably about 1 hour, to form a third solution containing the major portion of the cobalt which was present in the second washed solid and a third solid which is essentially calcium oxalate. Generally the calcium chloride concentration is about 2.5 moles of calcium chloride per mole of combined cobalt, iron, and nickel contained in the washed second solid.

The third solution is then separated from the third solid by any standard technique such as filtration.

The third solution contains at least about 95% by weight of the cobalt which is initially present in the starting alloy.

The cobalt can be recovered from the third solution by standard methods. One such method is described in U.S. Pat. No. 4,218,240 in which cobalt is recovered as the cobaltic hexammine.

The second solution contains at least about 95% weight of the chromium which is initially present in the alloy. A typical concentration of the chromium in the second solution is about 8 grams of Cr per liter. Typically the second solution contains no greater than about 0.05 grams of Co per liter, no greater than about 0.005 grams of Ni per liter and no greater than about 0.4 grams of Fe per liter. The chromium can be recovered as a relatively pure product from the second solution by known methods such as electrodeposition.

The above described process allows for the nearly complete separation of chromium from cobalt and the recovery of both metals. To more fully illustrate this invention, the following non-limiting example is presented. All parts, portions, and percentages are on a weight basis unless otherwise stated.

EXAMPLE:

About 100 parts of a stellite alloy grinding material is digested for about 5 hours in about 480 parts of concentrated hydrochloric acid at greater than about 100° C. The resulting solution is then separated by filtration from the insoluble material. The resulting solution contains about 36 grams of Co per liter, about 26 grams of Ni per liter, about 41 grams of Fe per liter, and about 20 grams of Cr per liter. To this solution is added oxalic acid in an amount sufficient to precipitate cobalt, nickel, and iron, the amount being about 1.1 moles of oxalic acid per mole of cobalt, nickel, and iron. Sodium hydroxide is then added to adjust the pH to about 2.0 and the resulting pH adjusted oxalic acid treated solution is then stirred for about 2 hours at less than about 20° C. The resulting solid which forms is then separated by filtration from the resulting mother liquor and washed with water which is removed from the washed solid by filtration. Analysis of the washed solid shows it contains at least about 99% by weight of the cobalt which was present in the hydrochloric acid solution. The mother liquor contains at least about 95% by weight of the chromium which was present in the starting alloy. Analysis of the mother liquor shows less than about 0.05 grams Co per liter, less than about 0.005 grams of Ni per liter, less than about 0.4 grams of Fe per liter and about 8.1 grams of Cr per liter The solid which is essentially oxalates of the metals contained therein, is digested in a boiling solution of calcium chloride at about 2.5 moles of calcium chloride per mole of cobalt, nickel, and iron. Analysis of the resulting chloride solution is as follows: about 26 grams of Co per liter, about 10 grams of Ni per liter, about 30 grams of Fe per liter and less than about 0.02 grams of Cr per liter. This represents a cobalt recovery of about 95% by weight of the cobalt which was initially present in the alloy. This solution, after filtering off of any insolubles, can be processed to cobalt metal powder by known methods.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for recovering cobalt and chromium from a cobalt and chromium containing alloy, said process comprising:
    (a) digesting said alloy in concentrated hydrochloric acid at a sufficient temperature for a sufficient time to form a first solution containing the major portion of said cobalt and said chromium and the major portion of any iron and nickel present in said alloy and a first solid;
    (b) separating said first solution from said first solid;
    (c) adding oxalic acid to said first solution in an amount sufficient to subsequently precipitate the major portion of the cobalt in said first solution and the major portion of any iron and nickel contained therein;
    (d) adjusting the pH of the resulting oxalic acid treated first solution to from about 1 to about 2 with a base and maintaining the temperature of the resulting pH adjusted oxalic acid treated first solution below about 20° C. for a sufficient time to form a second solid containing the major portion of the cobalt and any iron and nickel which is present in said first solution and a second solution containing the major portion of the chromium which is present in said first solution;
    (e) separating said second solid from said second solution;
    (f) washing said second solid with sufficient water to remove any water soluble impurities;
    (g) separating the resulting washed second solid from the resulting wash water;
    (h) contacting said washed second solid with a calcium chloride solution of sufficient calcium chloride concentration, at a sufficient temperature, for a sufficient time to form a third solution containing the major portion of the cobalt which was present in said second solid and a third solid; and;

(i) separating said third solution from said third solid.

2. A process according to claim 1 wherein from about 1 to about 2 moles of oxalic acid per mole of combined cobalt, iron, and nickel are added to said first solution.

3. A process according to claim 1 wherein said base is sodium hydroxide.

4. A process according to claim 1 wherein said calcium chloride solution contains about 2.5 moles of calcium chloride per mole of combined cobalt, iron, and nickel contained in said washed second solid.

5. A process according to claim 4 wherein said washed second solid is contacted with a calcium chloride solution at about 100° C. for about 1 hour.

6. A process according to claim 1 wherein said second solution contains at least about 95% by weight of the chromium which is present in said alloy and said third solution contains at least about 95% by weight of the cobalt which is present in said alloy.

* * * * *